(12) United States Patent
Fuentes et al.

(10) Patent No.: US 10,023,109 B2
(45) Date of Patent: Jul. 17, 2018

(54) METHOD FOR CONTROLLING A VEHICLE TAIL LIGHT AND A LIGHT ASSEMBLY FOR A VEHICLE

(71) Applicant: VALEO ILUMINACION, Martos (ES)

(72) Inventors: Manuel Fuentes, Martos (ES); Juan-Manuel Martinez, Granada (ES); Maria Del Carmen Montano, Martos (ES)

(73) Assignee: VALEO ILUMINACION, Martos (ES)

( * ) Notice: Subject to any disclaimer, the term of this patent is extended or adjusted under 35 U.S.C. 154(b) by 0 days.

(21) Appl. No.: 14/995,708

(22) Filed: Jan. 14, 2016

(65) Prior Publication Data

US 2016/0207450 A1    Jul. 21, 2016

(30) Foreign Application Priority Data

Jan. 15, 2015   (FR) ...................... 15 50305

(51) Int. Cl.
| | |
|---|---|
| *B60Q 1/34* | (2006.01) |
| *B60Q 1/22* | (2006.01) |
| *B60Q 1/26* | (2006.01) |
| *F21S 43/14* | (2018.01) |
| *F21S 43/237* | (2018.01) |
| *F21S 43/243* | (2018.01) |
| *F21S 43/249* | (2018.01) |

(Continued)

(52) U.S. Cl.
CPC .............. *B60Q 1/346* (2013.01); *B60Q 1/22* (2013.01); *B60Q 1/2607* (2013.01); *F21S 43/14* (2018.01); *F21S 43/237* (2018.01); *F21S 43/243* (2018.01); *F21S 43/247* (2018.01); *F21S 43/249* (2018.01); *B60Q 1/30* (2013.01); *B60Q 1/44* (2013.01); *B60Q 2400/20* (2013.01)

(58) Field of Classification Search
None
See application file for complete search history.

(56) References Cited

U.S. PATENT DOCUMENTS

| | | | | |
|---|---|---|---|---|
| 4,198,674 A | * | 4/1980 | Ilhage .................. | B60Q 1/0041 362/238 |
| 4,568,931 A | * | 2/1986 | Biolley .................. | H04B 10/27 398/1 |

(Continued)

FOREIGN PATENT DOCUMENTS

| | | |
|---|---|---|
| DE | 19753096 A1 | 6/1999 |
| DE | 102011009100 A1 | 3/2012 |

(Continued)

*Primary Examiner* — Chico A Foxx
(74) *Attorney, Agent, or Firm* — Oblon, McClelland, Maier & Neustadt, L.L.P.

(57) ABSTRACT

A method and tail light for controlling optical modules of the tail light, comprising the steps of activating one or more optical modules to generate a first signaling function, if the vehicle has reverse gear engaged, activating, according to a first mode of operation, one or more other optical modules to generate a second signaling function, if the vehicle does not have reverse gear engaged, activating the or at least one of the other optical modules to generate a complementary beam of light distinct from the beam of light that it emits in the first mode of operation and that supplements the first signaling function. The invention also relates to a tail light, notably for implementing this method.

20 Claims, 3 Drawing Sheets

(51) Int. Cl.
*F21S 43/247* (2018.01)
*B60Q 1/30* (2006.01)
*B60Q 1/44* (2006.01)

(56) References Cited

U.S. PATENT DOCUMENTS

| | | | | |
|---|---|---|---|---|
| 4,740,871 A * | 4/1988 | Dilouya | ............... | F21S 48/23 |
| | | | | 362/309 |
| 4,859,988 A * | 8/1989 | Holtvluwer | ............. | B60Q 1/26 |
| | | | | 307/10.8 |
| 6,243,008 B1 * | 6/2001 | Korabiak | ............. | B60Q 1/2607 |
| | | | | 340/463 |
| 6,250,788 B1 | 6/2001 | Muller | | |
| 6,402,356 B2 * | 6/2002 | Gotou | ................. | B60Q 1/2607 |
| | | | | 362/241 |
| 8,441,194 B2 * | 5/2013 | Huang | ................. | B60Q 1/2607 |
| | | | | 315/76 |
| 8,564,205 B2 | 10/2013 | Roberts et al. | | |
| 8,569,953 B2 * | 10/2013 | Huang | ................. | B60Q 1/2607 |
| | | | | 315/77 |
| 9,162,613 B2 * | 10/2015 | Huang | ................. | B60Q 1/2607 |
| 9,248,776 B2 * | 2/2016 | Kawamura | ............. | B60Q 1/30 |
| 2003/0206418 A1 * | 11/2003 | Strazzanti | ............... | B60Q 1/00 |
| | | | | 362/540 |
| 2005/0195073 A1 * | 9/2005 | Subbaraman | ........... | B60Q 1/38 |
| | | | | 340/465 |
| 2005/0254240 A1 * | 11/2005 | Lawrence | ........... | B60Q 1/2607 |
| | | | | 362/231 |
| 2007/0144799 A1 * | 6/2007 | Vasant | ................... | B60K 1/04 |
| | | | | 180/65.1 |
| 2009/0122566 A1 * | 5/2009 | Cunningham | ....... | B60Q 1/2696 |
| | | | | 362/487 |
| 2012/0081915 A1 * | 4/2012 | Foote | ................... | B60R 1/12 |
| | | | | 362/494 |
| 2012/0086335 A1 * | 4/2012 | Nguyen | ............... | B60Q 1/2607 |
| | | | | 315/77 |
| 2012/0229027 A1 * | 9/2012 | Huang | ................. | B60Q 1/2607 |
| | | | | 315/80 |
| 2012/0299476 A1 | 11/2012 | Roberts et al. | | |
| 2013/0322102 A1 * | 12/2013 | Thorailler | ........... | G02B 6/0006 |
| | | | | 362/487 |
| 2014/0160779 A1 * | 6/2014 | Pusch | ................... | F21S 48/236 |
| | | | | 362/511 |
| 2014/0233254 A1 * | 8/2014 | Meyrenaud | .......... | F21S 48/1154 |
| | | | | 362/520 |
| 2014/0252949 A1 * | 9/2014 | Ko | .......................... | F21S 48/20 |
| | | | | 315/77 |
| 2015/0167918 A1 * | 6/2015 | Yang | ..................... | F21S 48/215 |
| | | | | 362/516 |
| 2016/0016507 A1 * | 1/2016 | Cheng | ................. | B60Q 1/2665 |
| | | | | 362/540 |
| 2016/0207447 A1 * | 7/2016 | Orazem | ................ | B60Q 1/2661 |
| 2016/0257243 A1 * | 9/2016 | Son | .......................... | B60Q 1/50 |
| 2016/0380172 A1 * | 12/2016 | Brandl | ............... | H01L 25/0753 |
| | | | | 362/544 |

FOREIGN PATENT DOCUMENTS

| | | |
|---|---|---|
| DE | 102010056313 A1 | 6/2012 |
| DE | 102012017596 A1 | 3/2014 |
| DE | 102013105261 | 11/2014 |
| WO | 2012162203 A2 | 11/2012 |
| WO | 2014135762 A1 | 9/2014 |

* cited by examiner

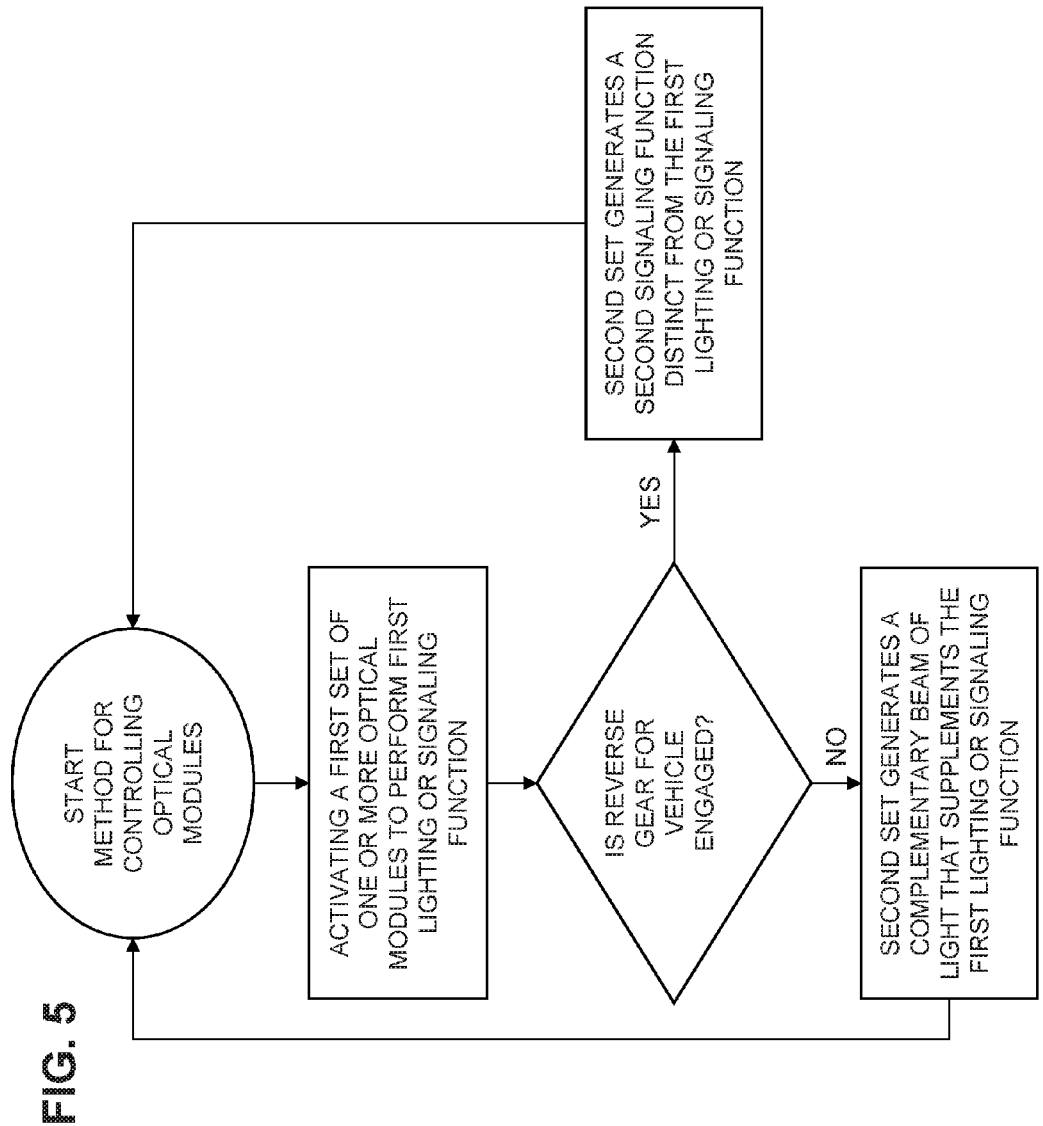

METHOD FOR CONTROLLING A VEHICLE TAIL LIGHT AND A LIGHT ASSEMBLY FOR A VEHICLE

CROSS-REFERENCE TO RELATED APPLICATIONS

This application claims priority to the French application 1550305 filed Jan. 15, 2015, which application is incorporated herein by reference and made a part hereof.

BACKGROUND OF THE INVENTION

1. Field of the Invention

The present invention relates to the field of motor vehicle tail lights, notably to tail lights with several optical modules generating beams of light and to methods for managing these optical modules.

2. Description of the Related Art

U.S. Patent Publication 2014/0160779 discloses a vehicle tail light in which a part of the light performs a stop light function, or indicates that the vehicle is braking, whatever the mode of operation of the tail light, and, underneath, a part which, according to two modes of operation, acts as a position light or as a turn indicator.

However, such a tail light occupies a certain amount of space. This is because the various parts thereof comprise at least as many different optical modules, such as light guides associated with light-emitting diodes, as there are signaling functions to be performed. Also, the part that generates the stop light needs to be powerful enough and have enough of an illuminating surface area that it can be seen, this also adding an additional constraint on space.

SUMMARY OF THE INVENTION

The technical problem that the invention seeks to solve is therefore that of reducing the size of a vehicle tail light while at the same time allowing it to perform its various signaling functions in accordance with the regulations.

To this end, a first subject of the invention is a method for controlling optical modules of a tail light of a vehicle, the method comprising the following steps:
- activating a first set of one or more optical modules, the first set generating a first signaling function,
- if the vehicle has reverse gear engaged, activating, according to a first mode of operation, a second set of one or more optical modules, so that the second set generates a second signaling function distinct from the first signaling function,
- if the vehicle does not have reverse gear engaged, activating, according to a second mode of operation, the or at least one of the optical modules of the second set, so that this optical module, referred to as a dual-function optical module, generates a complementary beam of light distinct from the beam of light it emits in the first mode of operation, this distinct complementary beam of light supplementing the first signaling function.

This method follows the opposite course of action to the solutions conventionally employed. Specifically, in tail lights of the prior art, certain signaling functions, notably the rear position light function or the stop light function, are always implemented with their power constantly maximized, in the case of the stop light, with the power maximized for a given braking intensity.

Now, the applicant company has noticed that in the case of these signaling functions, notably the tail position light function or the stop light function, it was possible to have a lower intensity of light when the vehicle was reversing than when the vehicle was moving forward. This is because a vehicle reverses under maneuvering situations or at least in places where the speed is not as high. By contrast, when the vehicle is traveling forward, it is far more likely to be driving in an area in which automotive traffic is traveling at high speed, particularly on an expressway. Thus, when the vehicle is moving forward, its signaling functions need to be visible from further away than when it is reversing.

As a result, the applicant company has selected a method using an optical module able to generate two different beams of light, hereinafter referred to as a dual-function optical module. According to this method, when the vehicle is reversing, or has engaged reverse gear, this dual-function optical module by itself performs or participates in a second signaling function, the first signaling function always being active or able to be activated by the first set of optical modules. When the vehicle is moving forward, or is in a forward gear, this dual-function optical module generates another beam referred to as the complementary beam of light, which supplements the first function, notably by enhancing it and/or increasing the aperture angle thereof, thus allowing the first signaling function to be seen from a greater distance.

The method according to the invention therefore makes it possible to gain compactness because one and the same module is used in two different functions, while at the same time maintaining satisfactory performance.

It should be noted that the first mode is implemented if the vehicle is reversing or if the vehicle has reverse gear engaged. The expression "the vehicle has reverse gear engaged" or "the vehicle is in reverse gear" means a configuration or a state of the vehicle that renders it able to reverse, for example when the gearshift lever is in a reverse gear position. The vehicle may actually be stationary, even though reverse gear is engaged, with the vehicle ready to reverse. This vehicle is therefore in a situation in which traffic speeds are as limited as they would be in a situation in which it were reversing.

Likewise, the fact that the vehicle is in reverse gear can be used in a substep of the method that makes it possible to detect whether the vehicle is reversing or ready to reverse.

Likewise, the second mode is implemented if the vehicle is moving forward or if the vehicle is in a forward gear. The expression "reverse gear is not engaged" or "the vehicle is in a forward gear" means a configuration or a state of the vehicle rendering it able to move forward, for example when the gearshift lever is in neutral or in a forward gear position. The fact that the vehicle is in a forward gear can be used in a substep of the method making it possible to detect whether the vehicle is moving forward or capable of moving forward.

Within the context of this invention, the reversing light function will be classified as part of the signaling functions.

The method according to the invention may optionally exhibit one or more of the following features:
- the first signaling function is a tail position light or a stop light; that makes it possible to enhance safety by making such functions visible from far away when the vehicle is likely to move forward;
- the first signaling function is a stop light, the step of activating the first set being implemented if the vehicle is braking; the method of the invention is all the more advantageous in terms of safety in the context of this stop light function;
- the second signaling function is a reversing light; since the reversing light is used only during or for the reversing of the vehicle, this reversing light is particularly suited to forming the second signaling function of the method according to the invention;

the complementary beam of light is designed to enhance the light intensity of the first signaling function; this is a simple way of allowing the first signaling function, particularly a stop light, to be seen from far away;

the complementary beam of light has a photometric distribution, the pattern of which is identical to that of the photometric distribution of the first function; the complementary beam of light thus has intensity ratios at various points of its photometric distribution that are identical to those of the first signaling function, thereby allowing the distribution of the light intensity of the beam of light generated by the first set of optical modules to be enhanced while at the same time maintaining the light intensity ratios at various points in the photometric distribution thereof.

Another subject of the invention is a vehicle tail light comprising:

a first set of one or more optical modules, the optical module or modules being able to generate one or more beams of light, in such a way that the first set generates a first signaling function, a second set of one or more optical modules, the optical module or modules being able to generate one or more beams of light in such a way that the second set generates a second signaling function distinct from the first signaling function, the or at least one of the optical modules of the second set, referred to as dual-function optical module, is arranged in such a way as to be able to emit two distinct beams of light alternatively, the first beam of light creating or participating in the creation of the second signaling function, and the second complementary beam supplementing the first signaling function.

This tail light is suited to implementing the method according to the invention. It therefore makes it possible to obtain the advantages of this method.

The tail light according to the invention may optionally exhibit one or more of the following features:

at least one of the optical modules comprises a light guide comprising at least one input diopter and at least one illuminating surface, the light guide being arranged in such a way as to be able to receive the rays of light emitted by a light source through this input diopter and guide these rays as far as this illuminating surface, whence these rays exit to generate alone or participate in the generation of the first signaling function or the second signaling function; this makes it possible to achieve different arrangements of other systems for directing the rays of light, such as, for example reflectors; the light guides can be coupled to light-emitting diodes, commonly referred to as LEDs; LEDs are particularly suited to being controlled by a method;

the dual-function optical module comprises a light guide comprising two input diopters distant from one another and an illuminating surface, notably a single illuminating surface, this light guide, referred to as a dual-input light guide, being arranged in such a way that:

one of the input diopters, referred to as the first input diopter, can receive the light from a light source through this input diopter, the other of the input diopters, referred to as the second input diopter, can receive the light from another light source through this second input diopter, it guides the light coming from its input diopters as far as the illuminating surface, whence this light will exit to generate or participate in the generation of the second signaling function or to supplement the first signaling function;

this is a simple way of embodying a dual-function optical module with a light guide; control of the dual-function optical module is also simplified because all that is required is action or nonaction on the power supply to the light source corresponding to the mode of operation to be implemented in the method according to the invention;

the dual-function optical module comprises the two light sources of different intensities and/or different colors, one of the light sources being arranged so as to emit through the first input diopter of the dual-input light guide, the other of the light sources being arranged to emit through the second input diopter of the dual-input light guide; this is a simple way of embodying different beams of light for the first signaling function and for the second signaling function, notably when these functions require different intensities and/or different colors;

the light sources from which the dual-input light guide receives the light are the photoemissive elements of distinct light-emitting diodes; LEDs are particularly well suited to being powered alternatively and therefore for being controlled by the method according to the invention;

the dual-function optical module comprises:

a light guide comprising an input diopter, notably an input diopter common to or separate from the two light sources, and an illuminating surface, notably a single illuminating surface, two light sources arranged to emit through the input diopter, the light sources having different intensities and/or different colors, the light guide being arranged to guide the light coming from its input diopter as far as this illuminating surface, whence this light will exit to generate or participate in the generation of the second signaling function or to supplement the first signaling function;

that allows the light guide to be embodied in a simpler way by having an input diopter common to the two light sources; according to one exemplary embodiment the light sources of the dual-function module are the photoemissive elements of one and the same light-emitting diode or of distinct light-emitting diodes; that allows the common input diopter to be embodied in a simpler way; this type of LED is known as a two-chip LED or a multichip LED, the chips corresponding to the photoemissive elements; in this case, these chips may be controlled autonomously;

one of the light sources of the dual-function optical module is able to emit red light and the other of the light sources of the dual-function optical module is able to emit white light; that allows a first function to be supplemented with red light, such as a stop function or a tail position light function, and a second function to be supplemented with white light, such as a reversing light;

the optical module or modules of the first set comprise light sources able to emit red light, so that the light emitted by the first set is red; that allows a first function to be performed using red light, such as a stop function or a tail position light function;

it comprises a control module controlling the light sources of the dual-function optical module, the control module being able to activate one of the light sources when the vehicle does not have reverse gear engaged and able to activate the other of the light sources when the vehicle is reversing and/or is in reverse gear; the device thus itself comprises elements for controlling the tail light in order to implement the method according to the invention; the control module may for example be integrated onto the electronic board that controls the light sources, notably the LEDs; information regarding the state of the vehicle may come from the vehicle itself, notably from sensors, the tail light comprising means for receiving signals containing this information.

Thus, according to one embodiment, the method of the invention is implemented for controlling the optical modules of a tail light according to the invention.

In the method according to the invention, or in the tail light according to the invention, the first function may be a stop light or a tail position light, more particularly a stop light, and the second function may be a reversing light.

These and other objects and advantages of the invention will be apparent from the following description, the accompanying drawings and the appended claims.

BRIEF DESCRIPTION OF THE ACCOMPANYING DRAWINGS

Further features and advantages of the invention will become apparent from reading the detailed description of the nonlimiting examples that follow, for the understanding of which reference will be made to the attached drawings, among which:

FIG. 5 is a schematic of a method in accordance with one embodiment of the invention.

DETAILED DESCRIPTION OF THE PREFERRED EMBODIMENTS

Figure 1:
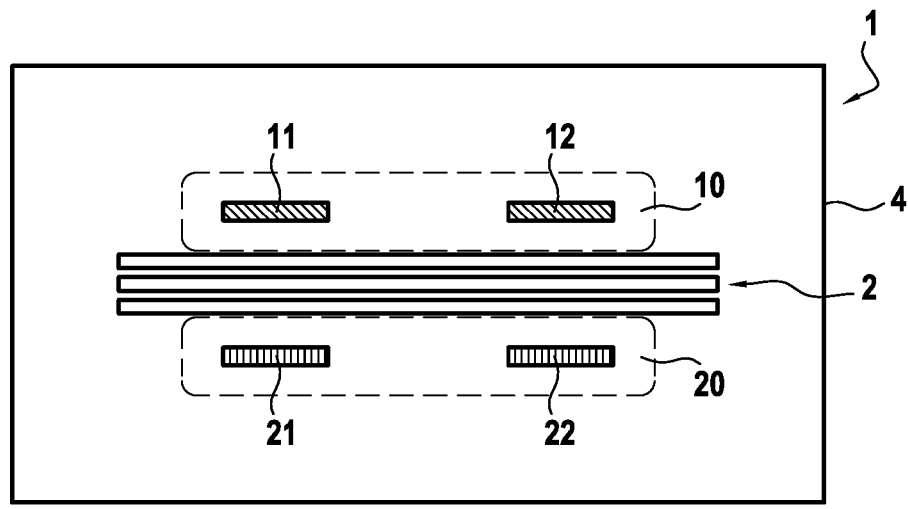
FIG. 1 depicts a front view of a vehicle tail light according to the invention in a first mode of operation.
Figure 2:
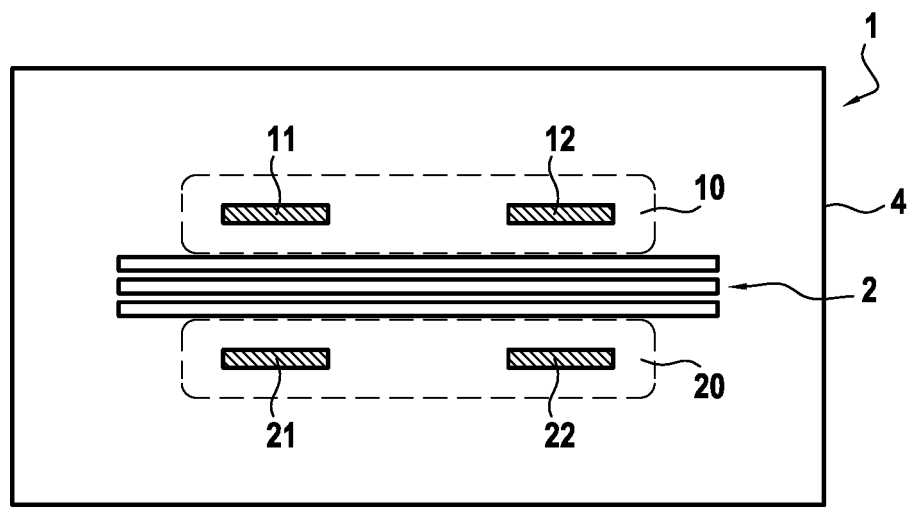
FIG. 2 depicts a front view of the vehicle tail light of FIG. 1 in a second mode of operation.

FIGS. 1 and 2 schematically illustrate a tail light 1 according to the invention in two modes of operation which are activated in accordance with the method according to the invention.

This tail light 1 comprises a housing 4 closed by a transparent outer lens (not depicted) in front of optical modules 11, 12, 21, 22 of this tail light 1. FIGS. 1 and 2 are views from the front, which means that only the illuminating surfaces of these optical modules 11, 12, 21, 22 are depicted.

The optical modules 11, 12, at the top in this example, form a first set 10. The optical modules 21, 22, at the bottom in this example, form a second set 10.

This first set 10 and this second set 20 of optical modules 11, 12, 21, 22 may be separated for example by a mask or by other optical modules performing another function, such as the town beam function, here represented by three horizontal bars referenced 2.

The optical modules 11, 12 of the first set 10 are each able to generate a beam of light. The two beams of light obtained perform a first signaling function, such as a tail light position function or a stop light function.

In the example described hereinafter the first function is a stop light, which will be activated when the vehicle brakes, whether this vehicle is moving forward or reversing and whether it is in a forward gear or in reverse gear. This stop light function is represented by the diagonal hatching in FIGS. 1 and 2.

The optical modules 21, 22 of the second set 20, hereinafter referred to as dual-function optical modules 21, 22, are each able to generate two distinct beams of light, used according to the mode of operation of these dual-function optical modules 21, 22 and therefore according to the mode of the operation of the tail light 1.

In FIG. 1, the vehicle has reverse gear engaged. According to the method example illustrated, the dual-function optical modules 21, 22 are made to operate in a first mode of operation, during which the dual-function optical modules 21, 22 each generate a beam of light, the two beams formed performing a second signaling function, in this example a reversing light. This reversing light function is represented by the vertical hatching in FIG. 1.

If, during the maneuver the vehicle brakes, the first set of optical modules 11, 12 will be able to emit a stop light function that is strong enough to be visible from a sufficient distance. In a parking lot, or in a side street, there is no need for this stop light to be seen from as far away as is required on a high-speed road.

When a forward gear is engaged, for example when the vehicle is traveling on a high-speed road, this stop light needs to be visible from further away.

Rather than adding additional modules devoted solely to providing additional power, the tail light 1 is produced in such a way that the optical modules 21, 22 of the second set 20 can generate beams of light different than those that they generate during the first mode of operation.

Thus, when a forward gear is engaged, according to the method illustrated, the dual-function optical modules 21, 22 are operated in a second mode of operation in which they will be able to generate additional beams of light which supplement the stop light generated by the first set 10, if the vehicle brakes.

Note that in this example, all of the optical modules of the second set 20 are configured as dual-function optical modules 21, 22. However, it would be possible to configure just one of them in this way. By creating the two optical modules as dual-function modules, the stop light function becomes visible from even further away.

In this example, the additional beam of light of each of the dual-function optical modules 21, 22 has a photometric distribution, the pattern of which is identical to that of the photometric distribution of the first function. This then enhances the intensity while at the same time maintaining the pattern and distribution on the photometric grating of the stop light function before it is supplemented by the dual-function optical modules 21, 22.

However, according to some embodiments that have not been depicted, the two dual-function optical modules 21, 22 may be configured in such a way as to enlarge the illuminating surface or even the angle of opening of the overall beam of light that performs this stop light function. It is also possible to have a dual-function optical module configured to operate according to one of the modes that have not been depicted and another dual-function optical module configured to operate according to the mode illustrated, notably as described in the paragraph above.

Figure 3:
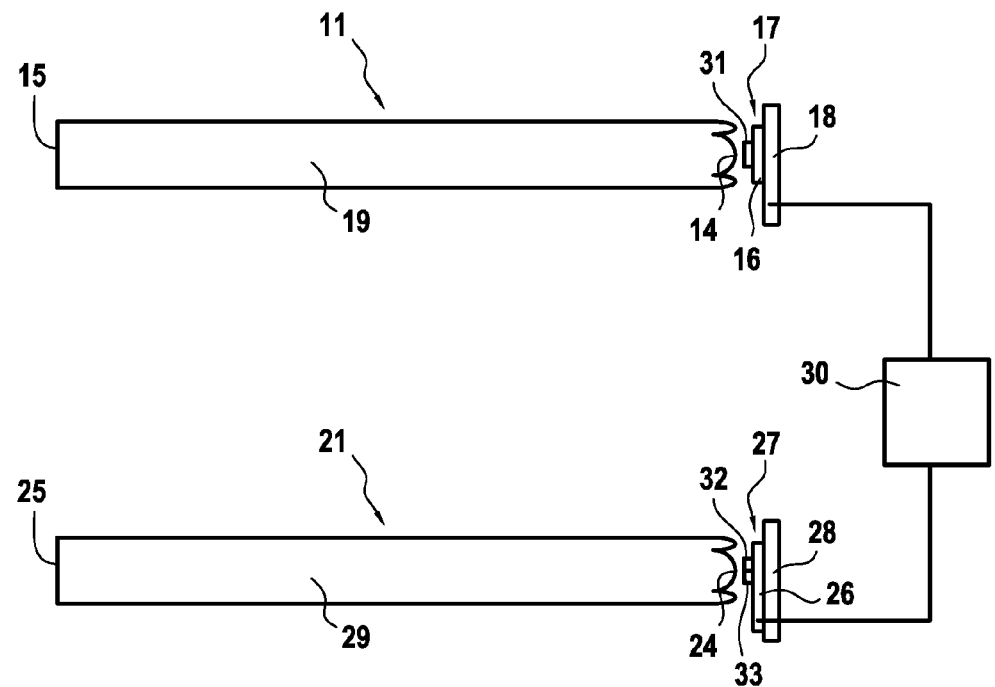
FIG. 3 depicts optical modules of the tail light according to the invention, according to a first embodiment of the dual-function optical module.

FIG. 3 illustrates an exemplary embodiment of the optical modules 11, 12, 21, 22 of the tail light of FIGS. 1 and 2. Only one optical module 11, 21 per set has been depicted. The description that follows can be read across to the other optical modules hereinabove referenced 12, 22. Each of the optical modules 11, 12 comprises a light guide 19, 29. Each of these light guides 19, 29 comprises an input diopter 14, 24, facing which there is a light-emitting diode 17, 27 (hereinafter referred to as LED) so that it emits its rays of light toward the corresponding input diopter 14, 24. These rays will then pass through the corresponding input diopter 14, 24 then be guided, notably by internal reflection, for example total internal reflection, inside the corresponding light guide 19, 29 off the faces of this light guide, as far as a terminal output diopter that forms the illuminating surface 15, 25 of this light guide 19, 29. These illuminating surfaces 15 and 25 are the visible image of the optical modules 11 and 21 illustrated respectively in FIGS. 1 and 2.

It will be noted that, in this example, these light guides 19, 29 are in the form of parallelepipedal sheets, the illuminating surfaces 15, 25 thereof visible from the front in FIGS. 1 and 2 being rectangular. Nevertheless, other shapes are possible.

Each LED 17 associated with a light guide 19 of one of the optical modules 11 or 12 of the first set 10 comprises a substrate 16 and a photoemitting element 31 mounted on this substrate facing the input diopter 14. This photoemitting element 31 is designed and configured to emit red light when subjected to electrical current. The substrate 16 is itself mounted on an electronic control board 18 of the LED 17. When the electronic control board 18 is supplying current to the photoemitting element 31, the latter emits rays of light that are red in color. The configuration of the light guide 19 will guide and deflect these rays in such a way that when they emerge, the rays emitted from the illuminating surfaces 15 of the light guides 11 or 12 of the first set 10 form a stop light.

Each LED 27 associated with a light guide 29 of one of the optical modules 21, 22 of the second set 20 comprises a substrate 26 and two photoemitting elements 32, 33 mounted on this substrate 26 and facing the input diopter 24 of this light guide 29. A first, 32, of these photoemitting elements is designed and configured to emit white light when subjected to an electrical current. A second, 33, of these photoemitting elements is designed and configured to emit red light when subjected to an electrical current. These two photoemitting elements 32 and 33 are mounted on one and the same substrate 26 such that the LED can be qualified as a two-chip LED. Alternatively, there may be two LEDs, each one mounted on its own substrate and positioned side by side. In both instances, the light source will hereinafter be referred to as a dual-function LED. The substrate 26 is itself mounted on an electronic control board 28 of the dual-function LED 27.

The electronic control board 28 for this dual-function LED 27 is connected to a control module 30 which, according to information signals received by the vehicle, determines how to illuminate the optical modules 21, 22 according to whether the vehicle is in a forward gear or in reverse gear.

If the vehicle is in reverse gear, the control module 30 transmits the instruction to activate the first photoemitting element 32 of the dual-function LED 27. The electronic control board 28 for this dual-function LED 27 then supplies current to the first photoemitting element 32 which then emits rays of light that are white in color. The configuration of the light guide 29 will guide and deflect these rays in such a way that on emerging, the rays emitted from the illuminating surfaces 25 of the light guides 29 of the second set 20 form a regulation reversing light.

The control module 30 is also connected to the electronic control board 18 for each LED 17 of the first set 10. In the event of braking, this control module 30 will send the braking instruction to this electronic control board 18 of the first set 10. This electronic control board 18 will then power the photoemitting element 31 and the first set 10 will generate a regulation stop function. The second set 20 will nevertheless continue to generate a reversing light function.

If the vehicle is in a forward gear, the control module 30 places itself in the second mode of operation. If, during this second mode of operation, the vehicle brakes, in addition to transmitting the braking instruction to the electronic control board 18 for the first set 10, the control module 30 transmits the instruction to activate the second photoemitting element 33 of the dual-function LED 27. The electronic control board 28 for this dual-function LED 27 then supplies current to the second photoemitting element 33 which then emits rays of light that are red in color. The configuration of the light guide 29 will guide and deflect these red rays in such a way that on exiting the rays emitted from the illuminating surfaces 25 of the light guides 29 of the second set 20 combine with the rays of light emitted by the illuminating surfaces 15 of the first set 10 and therewith form what is referred to as an enhanced-intensity stop light. This stop light will thus be more powerful than when the tail light is in the first mode of operation, and will therefore be visible from further away, something which becomes advantageous when traveling at high speed, notably on an expressway.

This tail light and the method according to the invention have therefore made it possible, when in a forward gear, to make use of the optical modules used to signal that the vehicle is reversing when reverse gear is engaged. This tail light and this method therefore make it possible to increase the power of the stop light signal without further cluttering the tail light with additional modules.

The control module 30 may determine whether the vehicle is in reverse gear or in a forward gear using sensors at the gearshift lever or using instructions it receives when reverse gear or forward gear is engaged.

Figure 4:
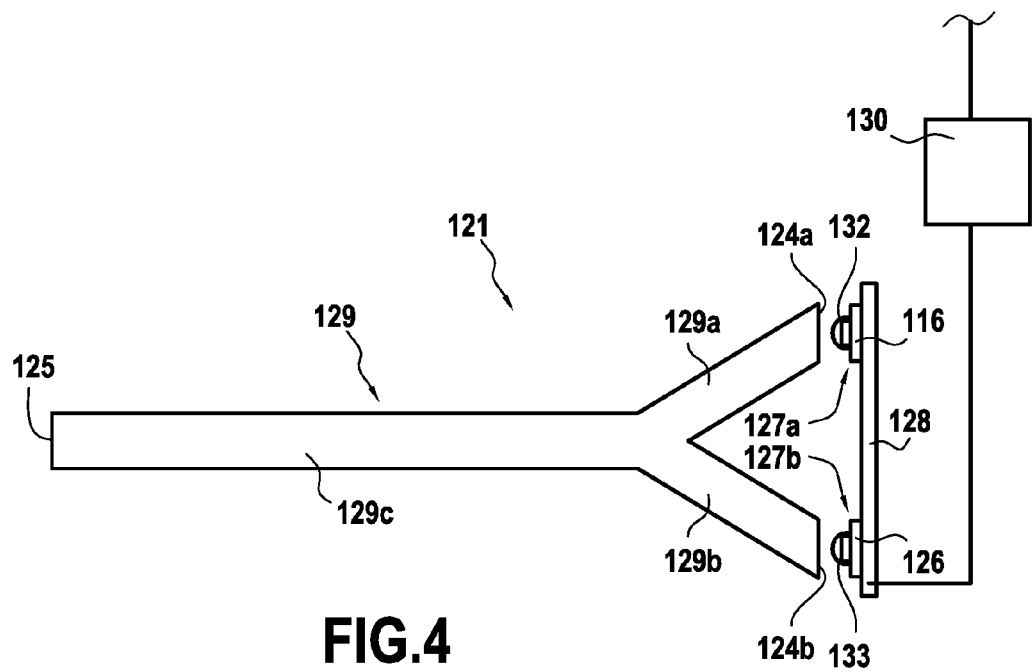
FIG. 4 depicts a dual-function optical module of the tail light according to the invention, according to a second embodiment.

The optical modules of the second set 20 may also be produced according to an embodiment illustrated in FIG. 4. The optical modules 11, 12 of the first set 10 remain identical to those illustrated in FIG. 3 and are therefore not depicted in FIG. 4.

As illustrated in FIG. 4, the light guide 129 of each second optical module 121 comprises a first input diopter 124a and a second input diopter 124b, these respectively being borne by a first branch 129a and a second branch 129b of the light guide 129. These two branches 129a, 129b meet in a common trunk 129c, which bears the output diopter that forms the illuminating surface 125 of the light guide 129.

This first and this second input diopter 124a and 124b are therefore distant and distinct from one other. An LED is arranged facing each of them, namely a first LED 127a facing the first input diopter 124a and a second LED 127b facing the second input diopter 124b.

Each of these LEDs 127a, 127b comprises a photoemitting element mounted on a corresponding substrate 116, 126.

The photoemitting element 132 of this first LED 127a is designed and configured to emit white light when subjected to an electrical current. The photoemitting element 133 of this second LED 127b is designed and configured to emit red light when subjected to an electrical current.

The substrates 116, 126 of these two LEDs 127a, 127b are mounted on one and the same electronic control board 128. The latter is connected to a control module 130, itself connected to the electronic control board or boards 18 for the optical modules 11, 12 of the first set 10.

In the event of braking, this control module 130 will send the braking instruction to this electronic control board 18 of the first set 10, as described hereinabove in respect of FIG. 3

In the embodiment of FIG. 4, if the vehicle is in reverse gear, the control module 130 transmits the instruction to activate the first LED 127a. The electronic control board 128 therefore supplies current to the first LED 127a. The photoemitting element 132 of this first LED 127a therefore emits rays of light that are white in color, through the first input diopter 124a. The configuration of the light guide 129 will guide and deflect these rays along the first branch 129a thereof, then along the trunk 129c thereof, as far as the output diopter from which they will exit. The light guide 129 is configured in such a way that the white rays emerging from the illuminating surfaces 25 of the light guides 21, 22 of the second set 20 form a reversing light.

FIG. 5 is a schematic view of a method in accordance with one embodiment of the invention.

As in the embodiment of FIG. 3, the control module 130 will be able to control the first set 10 in order to generate the stop light, while at the same time allowing the second set 20 in parallel to generate a reversing light function In the embodiment of FIG. 4, if the vehicle is in a forward gear, the control module 130 places itself in the second mode of operation. If, during this second mode of operation, the vehicle brakes, in addition to transmitting the braking instruction to the electronic control board 18 to power the LEDs 17, 27 of the optical modules 11, 12 of the first set 10, the control module 130 transmits the instruction to activate the photoemitting element 133 of the second LED 127b of the optical modules 121 of the second set 20. The electronic control board 128 of this second LED 127b therefore supplies current to its photoemitting element 133 and the latter therefore emits rays of light that are red in color. The configuration of the light guide 129 will guide and deflect these red rays along the second branch 129b thereof, then along the trunk 129c thereof, as far as the output diopter from which the rays will emerge. The light guide 129 is configured in such a way that the illuminating surfaces 25 of the light guides 21, 22 of the second set 20 therefore form a stop light with the rays of light emitted by the illuminating surfaces 15 of the first set 10.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A method for controlling optical modules of a tail light of a vehicle, said method comprising the following steps:
    activating a first set of one or more optical modules of the optical modules of the tail light, said first set generating a first light beam that performs a first signaling function,
    if the vehicle has reverse gear engaged, activating, according to a first mode of operation, a second set of one or more optical modules of the optical modules of the tail light, so that said second set generates a second light beam that performs a second signaling function distinct from said first signaling function,
    if the vehicle does not have reverse gear engaged, activating, according to a second mode of operation, said one or more optical modules of said second set, so that said one or more optical modules of said second set generates a complementary beam of light distinct from said second light beam that said one or more optical modules of said second set emits during said first mode of operation, said complementary beam of light supplementing said first signaling function,
    wherein said complementary beam of light has a photometric distribution pattern identical to a photometric distribution pattern of the first signaling function such that the complementary beam of light adds to or enhances an intensity of said first light beam so that said one or more optical modules of said second set cooperate with said first set of one or more optical modules of said first set to perform said first signaling function when said reverse gear is not engaged.

2. The method according to claim 1, in which said first signaling function is a tail position light or a stop light.

3. The method according to claim 2, in which said second signaling function is a reversing light.

4. The method according to claim 1, in which said second signaling function is a reversing light.

5. The method according to claim 4, in which said complementary beam of light is designed to increase a light intensity of said first signaling function.

6. The method according to claim 1, in which said complementary beam of light is designed to increase a light intensity of said first signaling function.

7. A vehicle tail light comprising:
    a first set of one or more optical modules, said first set of one or more optical modules being able to generate one or more beams of light in such a way that said first set of one or more optical modules generates a first light beam that performs a first signaling function,
    a second set of one or more optical modules, said second set of one or more optical modules being able to generate one or more beams of light in such a way that said second set of one or more optical modules generates a second light beam that performs a second signaling function distinct from said first signaling function,
    wherein at least one of said one or more optical modules of said second set, referred to as dual-function optical module, is arranged in such a way as to be able to emit two distinct beams of light alternatively, said second beam of light creating or participating in the creation of said second signaling function, and a complementary beam of light that supplements said first light beam during said first signaling function,
    wherein said complementary beam of light has a photometric distribution pattern identical to a photometric distribution pattern of the first signaling function such that the complementary beam of light adds to or enhances an intensity of said first light beam so that said one or more optical modules of said second set cooperate with said first set of one or more optical modules of said first set to perform said first signaling function.

8. The vehicle tail light according to claim 7, in which at least one of said first or second set of one or more optical modules comprises a light guide comprising at least one input diopter and at least one illuminating surface, said light guide being arranged in such a way as to be able to receive the rays of light emitted by a light source through said at least one input diopter and guide these rays of light as far as said at least one illuminating surface, whence these rays of light exit to generate or participate in the generation of said first signaling function or said second signaling function.

9. The vehicle tail light according to claim 8, in which said dual-function optical module comprises:
said light guide comprising said at least one input diopter and the illuminating surface,
two light sources arranged to emit through said input diopter, said two light sources having different intensities and/or different colors,
said light guide being arranged to guide the light coming from said input diopter as far as said at least one illuminating surface, whence this light exits to generate or participate in the generation of said second sign ling function or to supplement said first signaling function.

10. The vehicle tail light according to claim 8, in which said dual-function optical module comprises the light guide comprising two input diopters arranged in a common plane and being distant from one another and from the at least one illuminating surface, said light guide, referred to as a dual-input light guide, being arranged in such a way that:
one of said two input diopters, referred to as a first input diopter, can receive the light from the light source through said first input diopter,
the other of said two input diopters, referred to as a second input diopter, can receive light from another light source through said second input diopter,
the dual-input light guide guides the light coming from its input diopters as far as said illuminating surface, whence this light exits to generate or participate in the generation of said second signaling function or to supplement said first signaling function.

11. The vehicle tail light according to claim 7, in which said dual-function optical module comprises a light guide comprising two input diopters arranged in a common plane and being distant from one another and from an illuminating surface, said light guide, referred to as a dual-input light guide, being arranged in such a way that:
one of said two input diopters, referred to as a first input diopter, can receive the light from a light source through said first input diopter,
the other of said two input diopters, referred to as a second input diopter, can receive the light from another light source through said second input diopter,
it guides the light coming from its input diopters as far as said illuminating surface, whence this light exits to generate or participate in the generation of said second signaling function or to supplement said first signaling function.

12. The vehicle tail light according claim 11, in which said dual-function optical module comprises two light sources of different intensities and/or different colors, one of said light sources being arranged so as to emit through said first input diopter of said dual-input light guide, the other of said light sources being arranged to emit through said second input diopter of said dual-input light guide.

13. The vehicle tail light according to claim 12, in which said light sources from which said dual-input light guide receives the light are photoemissive elements of distinct light-emitting diodes.

14. The vehicle tail light according to claim 13, in which one of said light sources of said dual-function optical module is able to emit red light and the other of said light sources of said dual-function optical module is able to emit white light.

15. The vehicle tail light according to claim 12, in which one of said light sources of said dual-function optical module is able to emit red light and the other of said light sources of said dual-function optical module is able to emit white light.

16. The vehicle tail light according to claim 15, in which said one or more optical modules of said first set comprise at least one light source able to emit red light, so that the light emitted by said first set is red.

17. The vehicle tail light according claim 15, comprising a control module controlling said light sources of said dual-function optical module, said control module being able to activate one of said light sources when the vehicle is not in reverse gear and able to activate the other of said light sources when the vehicle is reversing and/or is in reverse gear.

18. The vehicle tail light according to claim 12, comprising a control module controlling said light sources of said dual-function optical module, said control module being able to activate one of said light sources when the vehicle is not in reverse gear and able to activate the other of said light sources when the vehicle is reversing and/or is in reverse gear.

19. The vehicle tail light according claim 7, comprising a control module controlling light sources of said dual-function optical module, said control module being able to activate one of said light sources when the vehicle is not in reverse gear and able to activate the other of said light sources when the vehicle is reversing and/or is in reverse gear.

20. A method for controlling the optical modules of the vehicle tail light of claim 8, said method comprising the following steps:
activating the first set of one or more optical modules, said first set generating the first signaling function,
if the vehicle has reverse gear engaged, activating, according to a first mode of operation, the second set of one or more optical modules, so that said second set generates the second signaling function distinct from said first signaling function,
if the vehicle does not have reverse gear engaged, activating, according to a second mode of operation, said one or more optical modules of said second set, so that said one or more optical modules generates the complementary beam of light distinct from a beam of light it emits in said first mode of operation, said complementary beam of light supplementing said first signaling function.

* * * * *